July 21, 1970 — E. HENNIG ET AL — 3,521,411
DISK-BRAKE CLEANING METHOD
Filed April 27, 1967 — 2 Sheets-Sheet 1
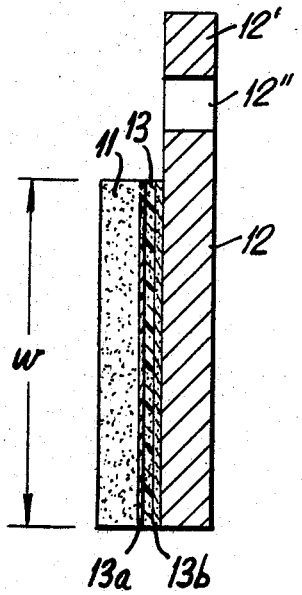
FIG. 1
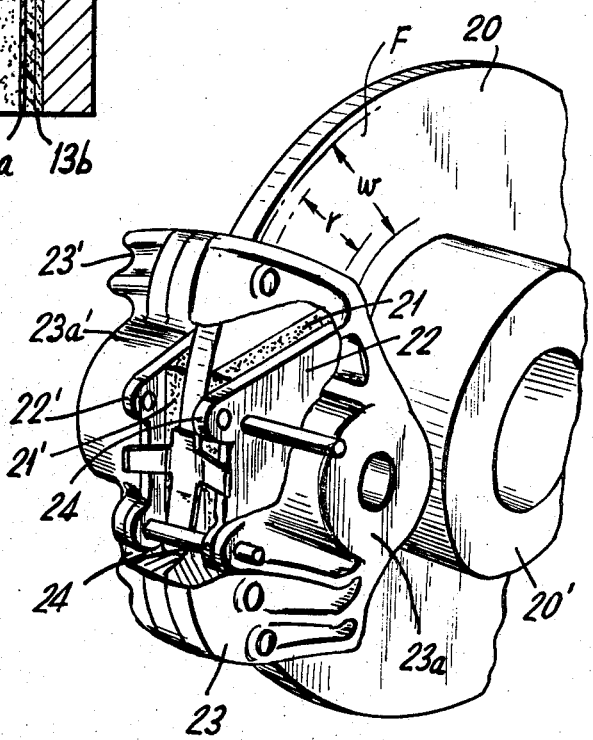
FIG. 2
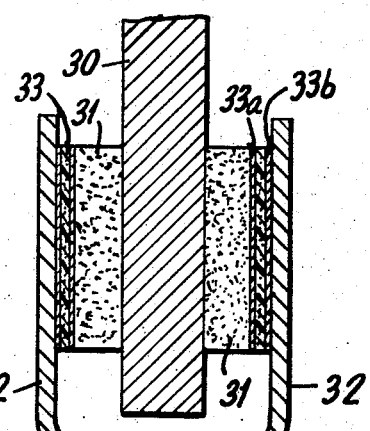
FIG. 3
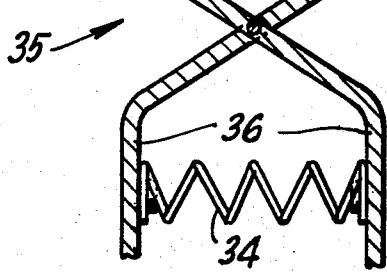
INVENTORS
ERICH HENNIG
WOLFGANG KAMMERMAYER
BY
Karl F. Ross
ATTORNEY 3,521,411
DISK-BRAKE CLEANING METHOD
Erich Hennig, Konigstein, and Wolfgang Kammermayer, Frankfurt, Germany, assignors to Alfred Teves Maschinen- und Armaturenfabrik KG, Frankfurt am Main, Germany, a corporation of Germany
Filed Apr. 27, 1967, Ser. No. 634,353
Claims priority, application Germany, May 21, 1966, T 31,199; Sept. 2, 1966, T 31,976
Int. Cl. B24b 1/00
U.S. Cl. 51—281      4 Claims

ABSTRACT OF THE DISCLOSURE

A method of cleaning the braking surface of a brake disk without dismounting the disk or completely dismantling the brake installation is disclosed, wherein a pair of grinding chocks or pads having a grindstone plaque or layer mounted upon a backing plate via a layer of thermal insulation is substituted for the brakeshoes or is retained against the disks and pressed against the area to be cleaned while the disk is rotated via an auxiliary motor frictionally engaging the periphery of the disk or through the axle of the disk.

---

Our present invention relates to the refinishing, cleaning and/or grinding of a brake disk and, more particularly, to the removal of rust, dirt or other contaminants deposited upon or accumulated by the annular braking faces of the disk.

A conventional disk-brake installation generally comprises a brake disk coupled to the wheel of an automotive vehicle and passing through a fixed or axially movable yoke, mounted upon the axle housing, which is provided with a pair of brake shoes, hydraulically, pneumatically or mechanically displaceable against the annular braking faces of the disk by an actuating means. In some cases, each of the brake shoes can be provided with a respective wheel-brake cylinder and the yoke can be fixed with respect to the disk. In other arrangements, the brake shoes are urged by a scissor linkage pivotally mounted on the yoke against the disk. In yet another system, the yoke itself is axially shiftable and one of the brake shoes is mounted directly thereon while the other brake shoe is biased by a hydraulic wheel cylinder against its braking face, the reaction force drawing the other brake shoe against the other braking face. Since cooling of the disk is generally accomplished simply by permitting air to come into contact with the dask as it emerges from the yoke, often there is no protection against penetration of dust or water into the inner parts of the installation and from coming into contact with the disk; as a consequence, the braking faces of the disk accumulate contaminants or develop a rust layer especially when the vehicle is not used frequently or has been in storage for some time. This problem also arises when a relatively long period lapses between completion of the vehicle and its delivery to the vehicle purchaser or operator.

One of the inconveniences arising from the contamination or rusting of the braking faces of the disk is that the braking faces are roughened thereby and cause considerable wear of the brake linings. In general, the brake linings are composed of a material (e.g. asbestos composition) having a high coefficient of sliding friction, good resistance to oil and water, and high compressive strength, although the resistance of the composition to frictional and abrasive wear is limited. As a result, the replacement of the brake shoe or its lining becomes a necessity in short order. Furthermore, when the driver of the vehicle is confronted with a situation in which the vehicle has to be slowed substantially instantaneously, he actuates the brake and the abrupt attempt at stopping the vehicle in this fashion can give rise to dangerous consequences when the braking faces of the disk are contaminated or rusted in the manner described. Thus, the brake shoes are pressed against the disk and suddenly seize the rusty or contaminated faces with an undetermined effect because the surface accumulations, if oily in nature, prevent frictional braking of the disk, whereas rusty surfaces may cause premature seizing and locking of the brakes.

It has, therefore, been necessary to check the brake disk regularly and often, especially when vehicles are stored for prolonged periods or have not been used for some time. When it is discovered that the brake disk is contaminated or rusted, the cleaning and polishing of the disk is essential if the aforementioned dangers are to be avoided. To clean and polish the brake disk, it has been necessary heretofore to remove the wheel and then dismantle the installation and withdraw the brake disk from the assembly. The brake disk is then mounted in a grinding apparatus independently of the vehicle or the brake assembly and frequently must be returned to the factory for proper surface grinding to remove dust, dirt, rust and like accumulations. Both the dismantling and grinding procedures are long and tedious and the reassembly of the brake system requires centering, alignment and readjustment, involving skilled mechanics and other highly paid personnel.

It is, therefore, the principal object of the present invention to provide a process for the cleaning and polishing of a brake disk whereby the aforementioned disadvantages can be avoided.

This object and others which will become apparent hereinafter are attained, in accordance with the present invention, by a method which involves juxtaposing with the annular braking faces of the brake disk of a disk-brake installation, a pair of grinding pads whose radial extent preferably exceeds the radial extent of the brake shoes, thereby ensuring complete resurfacing of the braking faces, and thereafter axially applying these grinding pads against the brake faces without disassembling the brake installation in its entirety or dismantling and removing the brake disk. The brake disk can be rotated, in accordance with the present invention, while axial pressure applies the grinding pads to the braking faces, thereby performing a resurfacing of the latter which removes all rust and other contaminants.

In accordance with one aspect of this invention, this method is carried out by removing the normal brake shoes of the installation, whose yoke can be provided with access openings permitting such removal without disassembling the yoke, and inserting in place of these brake shoes, a pair of grinding chocks or pads whose configuration and outlines resemble those of the brake shoes. Thus, the grinding chocks may be provided with backing plates of a material similar to that used to support the brake linings and, in place of brake linings, a ceramic grinding pad can be applied to each of the braking plates. In this case, the rotation of the disk is effected by driving the latter through its axle or by rotating the disk by frictional engagement with its periphery via an auxiliary motor. According to a feature of this aspect of the invention, the wheel of the associated disk can be remounted and grinding effected by driving the vehicle backwardly and forwardly while applying the brakes lightly and thereafter somewhat strongly. The grinding chocks will effectively abrade any contaminants remaining upon the disk while serving to brake the vehicle. Here, too, the radial extent of the grinding pads exceeds the radial extent of the brake linings, thereby ensuring the grinding, cleaning and polishing of a swath along each of the braking faces which is radially wider than the swath swept by the brake shoes during normal braking operation.

We have found it to be advantageous to mount the grinding layer on the backing plate via a thermally insulating layer of a synthetic resin and to secure the grinding pad to this layer via an adhesive and secure the layer, in turn, to the backing plate via further layer of adhesive. The grinding pads are composed of a bonded adhesive such as silicon carbide (e.g. Carborundum), tungsten carbide or the like, the abrasive particles being held together with an organic binder such as Bakelite resin or with a ceramic binder (e.g. sintered graphite or clay). The coarseness of the grinding pad is selected, in accordance with this invention, in dependence upon the amount of contamination or accumulation formed on the disk. When relatively thick layers of rust are encountered, relatively coarse grinding pads are used initially and, upon removal of a major amount of the contaminant layer, fine-grained grinding pads are substituted by replacing the initial grinding chocks with others of greater fineness.

According to another aspect of this invention, the brake shoes of the installation are not replaced by the grinding chocks but the grinding chocks can be applied against the braking faces of the disk externally on the brake yoke. In these cases, it has been found advantageous to employ a pair of clamping tongs or other clamping means adapted to urge the grinding chocks against the brake faces and entrainable by the disk so as to be brought into abutting relationship against the fixedly positioned yoke which retains the grinding chocks while continued rotation of the disk, induced by the axle or the auxiliary motor mentioned earlier, effectively removes the contaminant or rust layer without, again, dismantling of the disk. In some cases, it has been found advantageous to employ a portable grinding unit in which the grinding chocks are mounted and which includes a friction drive for the periphery of the disk. In this case, grinding of the rear-wheel disks of an automotive vehicle is carried out by placing the vehicle transmission in its "neutral" or "freewheeling" condition and bringing a friction-drive wheel to rest against the disk. The drive wheel may be rotated by an electric motor and rotates the brake disk at a speed sufficient to ensure fine grinding of the annular braking faces.

The above and other objects, features and advantages will become more readily apparent from the following description, reference being made to the accompanying drawing in which:

FIG. 1 is a transverse cross-sectional view of a grinding chock in accordance with the present invention;

FIG. 2 is a somewhat perspective exploded view showing a brake installation provided with grinding chocks in place of the brake shoes;

FIG. 3 is a cross-sectional view of another device for grinding the braking faces of a disk according to the present invention;

Figure 4:
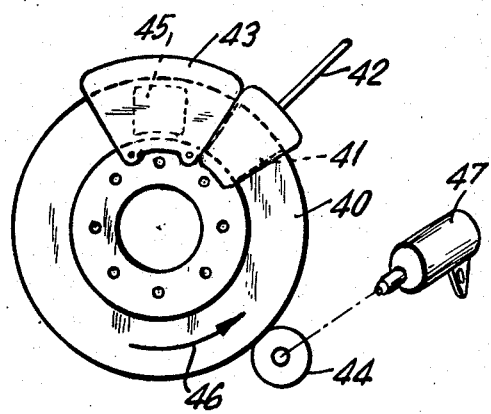
FIG. 4 is a vertical elevational view diagrammatically representing an embodiment of the method of the present invention.

In FIG. 1, we show a grinding chock 1 in accordance with the present invention, which comprises a metallic (e.g. steel) backing plate 12 whose configuration advantageously conforms to the configuration of a braking shoe of a braking installation whose disk is to be ground (see FIG. 2).

Thus, for example, a grinding chock of this type may be substituted for the braking shoes of a disk-brake installation as illustrated and described in the commonly assigned U.S. Pat. No. 3,182,754 issued May 11, 1965. The backing plate 12 carries a plaque or pad forming a grindstone 11 and is composed of abrasive particles (i.e. silicon carbide or Carborundum) bonded to coherency with an organic binding medium (e.g. of phenolformaldehyde resin such as Bakelite) or a ceramic binder (e.g. of baked or sintered clay or of the graphite type). Advantageously, a thermal insulating layer 13 in the form of a sheet or disk of epoxy resin is interposed between the grinding pad 11 and the backing plate 12 and is cemented to them by layers 13a and 13b of adhesive. The backing plate 12 is provided with lobes 12' and passages 12'' which may receive the spring members normally used to position the brake shoes when the latter are properly in place in the brake yoke. As can be seen from FIG. 2, the brake yoke normally comprises a pair of yoke members 23 and 23' which may be attached together to bracket the annular braking faces F of a disk 20 passing between the brake shoes. As illustrated and described in the aforementioned patent, the brake shoes can be removed without significant disassembly of the yoke and without removal of the brake disk 20, upon whose hub 20' the wheel of the vehicle can be mounted in the usual manner. The yoke 23, 23' is carried by the axle housing of the vehicle in the usual manner. Each yoke half 23, 23' is provided with a wheel cylinder 23a, 23a' which is supplied with hydraulic fluid from a master cylinder (not shown) and shifts the brake shoes against the braking faces of the disk 20 when the vehicle brake pedal is actuated.

According to one aspect of this invention, as described generally above, a rust or contamination layer along the braking faces F of the disk 20 may be removed by simply replacing the brake shoes with a pair of grinding chocks similar to the chock illustrated in FIG. 1. Each of the grinding chocks 21, 21' of FIG. 2 has a backing plate 22, 22' whose configuration conforms exactly to the configuration of the backing plate of the brake shoe, although the radial width $w$ of the grinding pad of each chock exceeds the radial width $r$ or the swath engaged by the brake linings which are bonded to the backing plates of the brake shoes in the usual manner. Thus, when the grinding chocks 21, 21' are applied against the braking faces of the disk 20, a radial width $W$ is refinished and ground. According to this invention, the refinishing can be carried out by any one of a number of techniques. It has been found to be advantageous, for example, once the grinding chocks 21 and 21' are substituted for the brake shoes, to replace the wheel which was removed to afford access to the brake shoes, and thereupon drive the vehicle along a road surface, while intermittently operating the brake pedal to urge the grinding chocks hydraulically against the faces of the disk. A few applications of the brakes, during which the hydraulic mechanism urges the chocks against the disk, generally suffice to remove all rust and contamination layers. The wheel can then be removed, the grinding chocks withdrawn and replaced by the brake shoes and the wheel remounted. Note that no disassembly of the yoke or removal of the disk was required.

In an alternative arrangement, after the grinding chocks 21, 21' have been substituted for the brake shoes in the installation of FIG. 2, the disk 20 is driven about its axis by either a friction-wheel drive of the type represented in FIG. 4, or by operating the vehicle engine while supporting the driven end of the vehicle off the ground. Again, actuation of the hydraulic brake system applies the chocks to abrade the rust and contamination layers.

We have found, moreover, that it may be desirable not to substitute grinding chocks for the brake shoes because of the inconvenience effectuating such substitution or because the available grinding chocks do not correspond in configuration to the brake shoes. In this case, we prefer to make use of a system of the type illustrated in FIGS. 3 and 4, in which the grinding pads 31 are mounted upon a pair of elongated members forming a pair of tongs 35. The members 32 are, in this case, bonded to the abrasive pads 31 (whose composition conforms to that of pad 11) via a sheet 33 of thermal insulation which is cemented at 33a and 33b to the respective member 32 and the associated pad. The handles 36 of the tongs 35 are biased outwardly by a spring 34 which applies the force necessary to urge the pads 31 of the grinding chocks against a disk 30. As can be seen from FIG. 4, the clamped assembly 42, whose grinding chocks 41 are of the construction and orientation illustrated in FIG. 3, engages the disk 40 which is rotatable in the direction of arrow 46 about its axis. While this rotation of the disk, especially where the brake of a driven wheel is concerned, can be effected through the axle, we prefer to provide a friction wheel 44, which may be driven by a hand-held unit such as an electric drill as represented at 47. The clamp 42 is rotatably entrained by the disk 40 when it is locked into engagement with the disk and is carried thereby against the yoke 43 of the brake installation whose brake shoes are diagrammatically represented at 45. Thus, the clamp 43 need not be retained by the operator and urges its pads against the braking faces of the disk, over a swath wider than the radial width thereof as the disk 40 is rotated relatively to the clamp 42 and the yoke 45.

Figure 5:
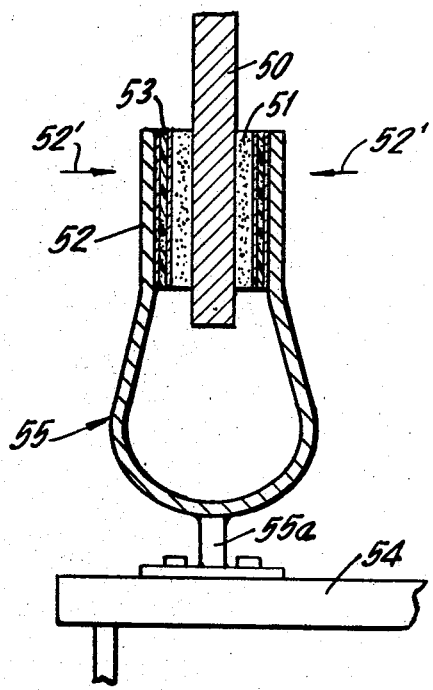
FIG. 5 is a side view of yet another apparatus for carrying out this method.
Figure 6:
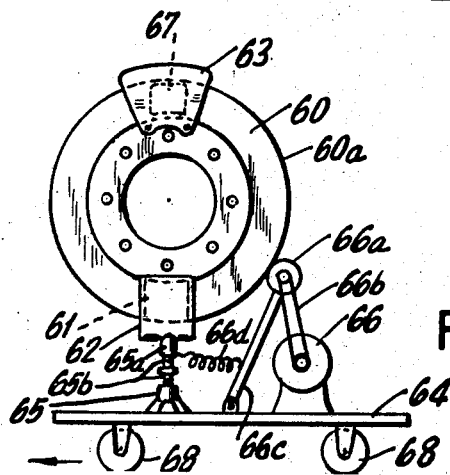
FIG. 6 is a view similar to FIG. 4 of another device.

In FIGS. 5 and 6, we show an arrangement in which the clamping means and the friction drive means are mounted upon a portable platform 64 in the form of a dolly whose wheels are represented at 68. In this arrangement, the friction drive is effected via a wheel 66a driven via a belt 66b from a motor 66 carried by the platform 64. An actuating bar 66c in which the wheel 66a is journaled, is held against the periphery 60a of the brake disk 60 by a spring 66d and can be deflected by hand away from the disk. A stand 65 is fixed to the platform 64 and supports a clamp 62 whose grinding pads 61 are of the composition and construction previously described. The shank 65a of the clamp is connected with the stand 65 via a threaded rod 65b which adjusts the pads 61 radially with respect to the disk. The vehicle can then be jacked up, the wheel removed and the platform 64 moved into position with the disk 60 between the chock 61 and the wheel 66a in frictional engagement with the disk. The motor 66 is then started while the spring clamp 62 holds the chocks against the braking faces of the disk. The yoke of the brake installation is represented at 63 and has brake shoes 67 which, in this case, need not be replaced. In the arrangement of FIG. 5, the shank 55a of the clamp 55 is mounted on the movable platform 54 while the clamp has the configuration of a pair of tongs. The shanks or members 52 of the tongs are urged by the inward spring bias thereof in the direction of arrows 52' to bring the grinding chocks 51 into contact with the brake disk 50. Insulating layers 53 are provided between the chocks and the members 52.

The invention described and illustrated is believed to admit of many modifications within the ability of persons skilled in the art, all such modifications being considered within the spirit and scope of the appended claims.

We claim:
1. A method of cleaning the annular braking faces of a brake disk of a vehicle disk-brake installation whose brake yoke lies along the periphery of said disk and has an actuating mechanism adapted to apply a pair of brakeshoes axially against the braking faces, said method comprising the steps of:
urging axially against the braking faces of said brake disk, without removing same from said installation, a pair of grinding chocks; and rotating said disk about its axis while said chocks are urged thereagainst, said grinding chocks having a configuration similar to that of the brakeshoes, said grinding chocks being applied against said braking faces of said disk by substituting said grinding chocks for said brakeshoes, said grinding chocks being biased against said disk by the brake-actuating mechanism.
2. The method defined in claim 1 wherein said disk is rotated by applying a rotating friction wheel to the periphery of said disk.
3. The method defined in claim 1 wherein said brake disk is rotated by operating said vehicle.
4. A method of cleaning the annular braking faces of a brake disk of a vehicle disk-brake installation whose brake yoke lies along the periphery of said disk and has an actuating mechanism adapted to apply a pair of brakeshoes axially against the braking faces, said method comprising the steps of:
urging axially against the braking faces of said brake disk, without removing same from said installation, a pair of grinding chocks; rotating said disk about its axis while said chocks are urged thereagainst, said grinding chocks being resiliently clamped against said braking faces externally of said yoke, said chocks being free to move with said disk; retaining said chocks against said yoke upon its entrainment by said disk; and continuing the rotation of said disk while maintaining said clamp substantially stationary.

References Cited

UNITED STATES PATENTS

| | | | |
|---|---|---|---|
| 2,462,176 | 2/1949 | Fryar | 51—241 X |
| 3,007,290 | 11/1961 | Davis et al. | 51—255 |
| 2,664,679 | 1/1954 | Kelly | 51—161 X |
| 2,164,867 | 7/1939 | Blood | 51—161 X |
| 3,060,649 | 10/1962 | Barrett | 51—241 |
| 3,333,366 | 7/1967 | Czubak et al. | 51——67 |

JAMES L. JONES, JR., Primary Examiner